Jan. 30, 1923.

C. E. STAHL.
TRACTOR.
FILED JAN. 17, 1918.

Witness.
H. G. Barrett.

Inventor
Charles E. Stahl
By: Arthur F. Durand
Atty

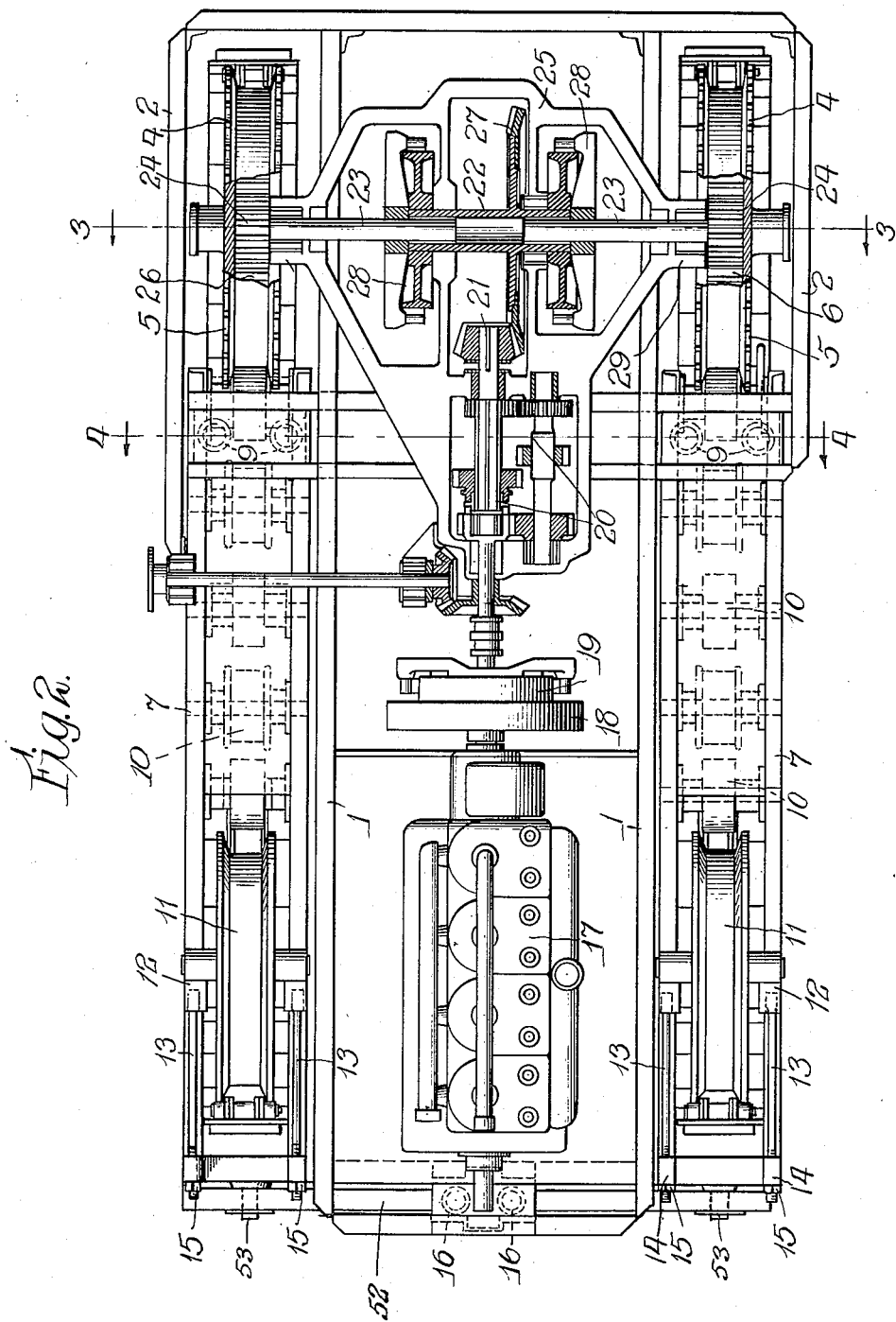

Jan. 30, 1923.
C. E. STAHL.
TRACTOR.
FILED JAN. 17, 1918.
1,443,768
3 SHEETS-SHEET 3
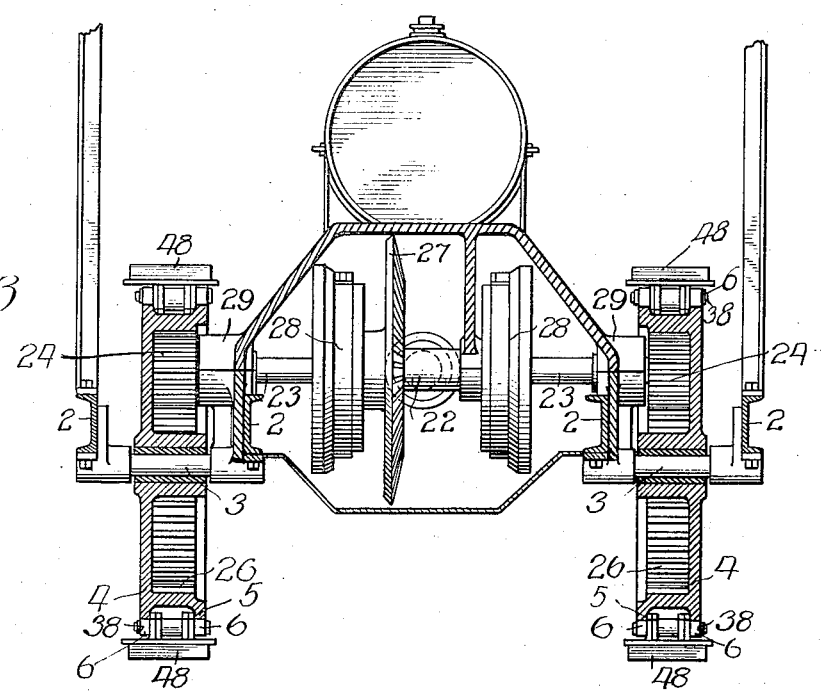
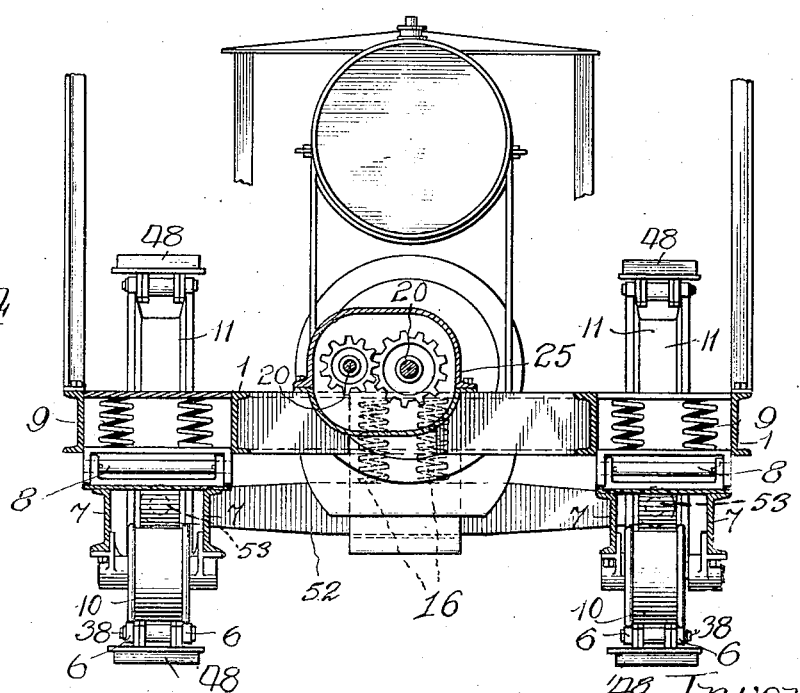

Patented Jan. 30, 1923.

1,443,768

UNITED STATES PATENT OFFICE.

CHARLES E. STAHL, OF WINTHROP HARBOR, ILLINOIS, ASSIGNOR, BY MESNE ASSIGNMENTS, TO F. C. AUSTIN MACHINERY COMPANY, A CORPORATION OF ILLINOIS.

TRACTOR.

Application filed January 17, 1918. Serial No. 212,171.

*To all whom it may concern:*

Be it known that I, CHARLES E. STAHL, a citizen of the United States of America, and resident of Winthrop Harbor, county of Lake, and State of Illinois, have invented a certain new and useful Improvement in Tractors, of which the following is a specification.

This invention relates to tractors of that kind in which the entire machine is supported on a pair of traction belts, arranged side by side, and in which means are provided for operating each belt independently of the other, whereby one belt can be driven faster than the other to turn the machine to the right or the left, or whereby one belt can stand still, if such is necessary, while the other belt is traveling forward, thereby to turn the machine around in a small space.

Generally stated, the object of the invention is to provide a novel and improved tractor of the foregoing general character.

Special objects are to provide an improved construction and arrangement for enabling the traction belts to travel advantageously over uneven ground; to provide an improved construction and arrangement for driving each traction belt independently of the other; and to provide certain details and features of construction and combinations tending to increase the general efficiency and desirability of a tractor of this particular construction.

To these and other useful ends, the invention consists in matters hereinafter set forth and claimed.

Figure 2 is a view of the machine shown in Figure 1, with certain portions thereof in horizontal section.

Figure 3 is a transverse section on line 3—3 in Figure 2, with certain parts shown in elevation.

Figure 4 is a transverse section on line 4—4 in Figure 2.

Figure 1:
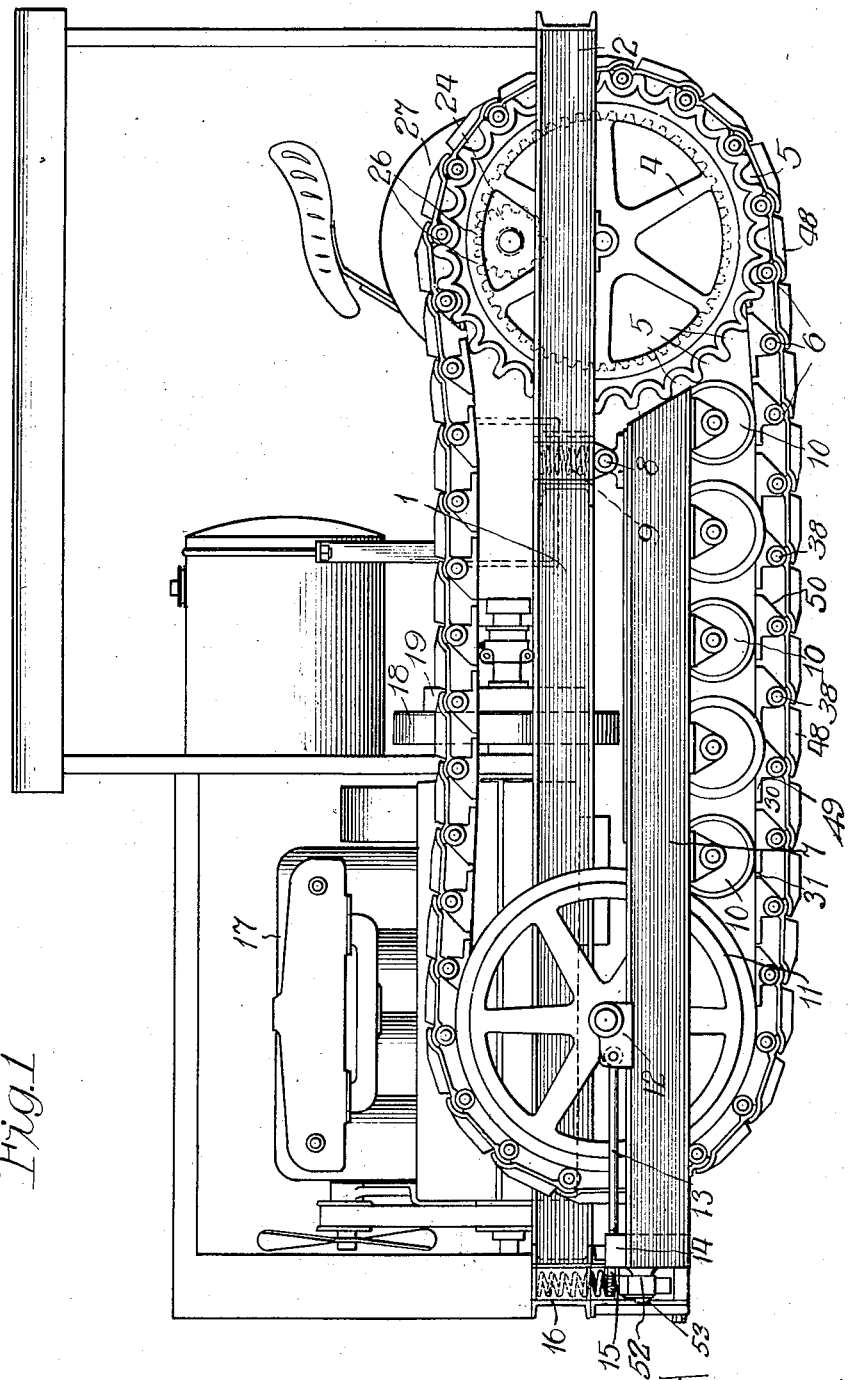
Figure 1 is a side elevation of a caterpillar tractor embodying the principles of the invention.

As thus illustrated, the invention comprises a body frame or chassis 1 provided at its rear end with lateral extensions 2, the latter having transversely alined spindles or axles 3 upon which the driving wheels 4 are mounted to rotate. These wheels 4 have peripheral notches 5 to engage the rollers 6 on the flexible traction belts, one at each side of the machine, by which the body or chassis of the tractor is supported. Auxiliary frames 7 are arranged at opposite sides of the chassis or body frame, and are pivoted to swing up and down about a transverse axis 8 disposed immediately in front of the driving wheels 4, so that the front ends of these frames 7 swing up and down. The pivots which provide the axis 8 are preferably provided with springs 9 which carry the weight of the chassis or body frame, and through which said weight is communicated to the auxiliary frames 7, the latter being provided on their undersides with wheels or rollers 10 which travel on the belts. Near their forward ends the auxiliary frames 7 are provided with idlers 11 which are grooved to receive the two belts and prevent lateral displacement thereof. These idlers 11 are supported by bearings or blocks 12 which are slidable longitudinally on the frames 7 so that the two traction belts can be tightened when such is necessary or desirable. For this purpose, longitudinal rods 13 are connected to said bearings or blocks 12 and extend forward through shoulders 14 on the front ends of the frames 7 and are provided with adjusting nuts 15 whereby the idlers 11 can be pulled forward to tighten the two traction belts. The forward ends of the frames 7 are suitably connected together by a transverse connecting member, and the front end of the body or chassis 1 is supported on this transverse connecting member through the medium of springs 16, so that the weight of the chassis or body frame is cushioned on the forward ends of the auxiliary frames 7; and, by the provision of the previously described springs 9, the weight of the chassis or body frame is cushioned on the rear ends of each auxiliary frame. Practically the entire weight of the machine is communicated through said springs to the rollers 10, and from the latter to the two traction belts. The idlers 10 and the driving wheels 4 are high enough so that they do not ordinarily communicate the weight to the traction belts, although they will do so at times in traveling over rough ground. For operating the driving wheels 4, the following arrangement is employed: On the forward portion of the chassis an engine 17 of any suitable character is mounted, and this engine is provided with the usual fly-wheel 18 and clutch 19, whereby the transmission of power from the engine to the gear-box or gear-set 20 may be controlled at will.

It will be understood that this gear-set or gear-box may be of any suitable known or approved form, and is of such character, like those used on automobiles and tractors in general, that the bevel pinion 21 at the rear end thereof can be rotated at will, in either direction, thereby to drive the tractor either forward or backward. A sleeve 22 is loosely mounted on the two transversely alined shafts 23, and the latter are provided at their outer ends with pinions 24, each shaft being suitably mounted for rotation in bearings on the main body frame or chassis, or in the housing 25 of the gearing, which latter is rigidly secured to the main body frame. The driving wheels 4 have internal gear-teeth 26 which engage the pinions 24, the latter being disposed directly above the transverse axis of said driving wheels. A bevel-gear 27 is rigidly secured to the sleeve 22 and arranged in position to engage the bevel pinion 21, which latter, as previously explained, can be rotated in either direction by power transmitted from the engine through the shifting gear-set 20, so that the bevel gear 27 can be rotated in either direction. Friction clutches 28, of any suitable character, are provided at the opposite ends of the sleeve 22, and through these clutches said sleeve can be connected to the shafts 23, in a manner that will be readily understood, thereby to rotate the pinions 24 and thus drive the tractor.

It will be understood, of course, that hand-levers (not shown) or any other suitable means, can be employed for controlling the clutch 19 and the gear-set 20 and the clutches 28, thereby to drive the tractor either backward or forward. With this arrangement, one clutch 28 can be left open while the other clutch 28 is closed, and in this way one flexible traction belt will stand still while the other is operated, thus turning the machine around in a comparatively small space. Preferably, the gear housing 25 is provided with hub extensions 29 upon which the driving wheels 4 rotate, and whereby the shafts 23 are relieved from strain and weight.

The traction belts, in the present instance, are formed by links 30, each of which is bifurcated at one end to provide two end portions 31 into which a reduced end of an adjoining link extends, bolts 38 being inserted through the interlocked links. Each link is provided with an overhanging top portion 49 and is beveled at 50, the construction being such as to permit an end of one link to tilt downward toward the tread plate of the next link when the belt is flexed in traveling around the driving and idler wheels, whereby the belt is freely flexible at all times, the pivotal action between the links being sufficient to serve this purpose.

It will be understood that the links are provided with tread plates of suitable form and that wearing portions, or treads 48 are attached to these plates and travel on the ground to provide the desired traction or propelling effect.

As a matter of further and special improvement, the transverse member 52 by which the two auxiliary frames are connected together at their forward ends may be pivotally connected to the front ends of these auxiliary frames, and in this way either frame can swing up and down at its forward end independent of the other frame 7, as the member 52 will be free to have a transverse tilting action, and the springs 16 being preferably arranged close together at the center of the frame 1 (see Figure 2) thus permitting this more or less independent action of the two traction devices. With this arrangement, the front end of one traction device may rise as it travels over an obstruction while the front end of the other traction device remains in normal position, or the front ends of the two frames 7 may rise together, depending upon the uneven character of the ground over which the machine is traveling. The transverse member 52, in this way, serves as an equalizer bar, and with the two springs 16 arranged close together at the longitudinal center of the machine, the tractor body or chassis 1 has a three-point suspension, two points in rear on the rear ends of the auxiliary frames 7, and the third point being in front at the center of the equalizer bar. Each pivot 53 is, it will be seen, interposed between the equalizer 52 and the front end of one of the frames 7, so that the axis of each pivot 53 extends longitudinally of the tractor at a point midway between the opposite sides of each frame 7, such axes being located at the center of the treads of the wheels 4 and 11, so that the weight is centrally imposed on the front end of each said frame. In this way the weight on each frame 7 is balanced, so to speak, so that the frame does not tend to twist or turn over sidewise, and whereby the weight is evenly supported so that the traction belt rests firmly and squarely on the ground. With this arrangement, therefore, the axis of each pivot 53 extends longitudinally and centrally of the caterpillar traction device, so that each traction device, in its entirety, is practically balanced about the longitudinal axis of its front pivot.

With the construction shown and described, it will be seen that either truck frame 7 is adapted to move up and down bodily and independently of the other truck frame, relatively to the body frame 1, because of the three-point spring suspension arrangement by which the body frame is carried on the two truck frames. In other words, each pivot 8 has a load-carrying spring and springs 16 are provided at the front, so that a three-point suspension is provided for the chassis or body frame of the vehicle, with a load-sustaining spring at each point. Therefore, as shown and described, each truck frame 7 is also adapted to move up and down at either end thereof independently of its other end. The pivots 8 are mounted entirely in front of the sprocket wheels 4, with the construction shown and described, as all of the wheels travel on the central or middle portion of the belt, the rear end of each truck frame 7 stopping short of the periphery of the sprocket wheel immediately in rear thereof. In this way, therefore, the transverse axis provided by the pivots 8 is in front of or entirely ahead of the two sprocket wheels, and does not intersect the latter at any point, the axis of the sprocket wheels and the axis of the front idler wheels and the said transverse axis provided by the pivots 8 being preferably in the same horizontal plane. In this way, the vehicle is adapted to travel very comfortably and flexibly and yieldingly over rough or uneven ground in a manner that not only insures, or tends to insure, against breakage, but also in a way that tends to insure better traction for the belts.

What I claim as my invention is:—

1. In a tractor, a driving wheel, an idler wheel, an endless traction belt extending around said wheels to travel on the ground, a body frame on which said driving wheel is mounted, a member on which the idler wheel is mounted, a transverse pivot in front of said driving wheel, providing a pivotal connection between said member and the body frame through which connections the load weight is communicated to said member from the body frame, whereby said member and idler wheel swing up and down relatively to the body frame about a transverse axis ahead of the driving wheel, instrumentalities in front of said idler wheel to support the body frame on said member, and means on said member to impose the weight of the body on the lower portion of said belt.

2. A structure as specified is claim 1, and means including a spring to impose the weight of said body on the portion of said member which swings up and down a distance form said axis.

3. A structure as specified in claim 1, and spring means interposed between said pivot and said body frame, through which the load weight is communicated to the pivot from the body frame, whereby said axis is movable up and down relatively to said body frame.

4. A structure as specified in claim 1, said idler wheel being in front and said driving wheel being in rear thereof, said axis being disposed between said wheels, and a spring disposed above said axis to yieldingly hold said pivot down.

5. In a tractor, the combination of a body frame, rear driving wheels carried on said frame, front idler wheels disposed one at each side of the said body frame, members pivoted on said body frame at points entirely in front of said driving wheels and extending forward to support said idler wheels, an endless traction belt extending around each driving wheel and around the idler ahead thereof, instrumentalities in front of said idler wheels to support the body frame on said members, and means on said members to impose the weight of said body frame on the lower portions of said belts.

6. A structure as specified in claim 5, said instrumentalities having means to yieldingly connect the forward ends of said members with said body frame, so that said members swing up and down relatively to said body frame about an axis extending transversely and immediately in front of said driving wheels.

7. A structure as specified in claim 5, and spring means interposed between said body frame and the pivots of said members, through which the load weight is communicated from the body frame to the pivots.

8. A structure as specified in claim 5, in combination with power-transmitting mechanism to operate said driving wheels, including means whereby either driving wheel may be operated independently of the other.

9. A structure as specified in claim 5, said driving wheels having internal gear-teeth, and said body frame being provided with power-transmitting mechanism including pinions for engaging said internal gear-teeth.

10. In a tractor, a main body frame, a traction belt at each side of said body frame and load supporting instrumentalities associated with each traction belt and pivotally connected at the front, said instrumentalities including springs at the rear thereof and upon the front pivotal connection for providing a yielding three-point suspension for said body frame and being pivoted on said frame, said last mentioned pivot and the front pivotal connection permitting tilting of the frame and traction means and rendering the latter adjustable to uneven surfaces.

11. A structure as specified in claim 10, said instrumentalities including an equalizer bar extending transversely and operated at each end in front of said belts.

12. A structure as specified in claim 10, said instrumentalities comprising an auxiliary frame for each traction belt, pivots and springs to support the body frame on the rear ends of said auxiliary frames, and a transversely arranged tilting equalizer bar and springs to support the forward end of said body frame on the forward ends of said auxiliary frames, having on equalizing pivot for the front end of each auxiliary frame.

13. In a tractor, the combination of a main body frame, a traction device at each side of said body frame, a pivotal transverse bar, pivots between the ends of said bars and the front ends of said traction devices, means to yieldingly support the load weight on said devices, and means including springs to yieldingly support the front end of said body frame on the middle portion of said bar.

14. In a tractor, the combination of a body frame, a pair of truck frames disposed at opposite sides of the body frame, transverse means connecting the forward ends of the truck frames together, means including springs to impose the weight of the body frame on the rear ends of said truck frames, idler wheels on said truck frames at one end and sprocket wheels on said frames at the opposite ends; traction belts supported on said sprocket wheels and idler wheels, means on said truck frames to impose the load weight on the lower portions of said belts, means for driving said sprocket wheels to operate the traction belts, and means including a spring to impose the weight of the body frame on said transverse means, so that a three-point suspension is provided for the body frame, with a spring carrying the load at each point of said suspension.

15. A structure as specified in claim 14, each truck frame being movable up and down bodily and independently of the other truck frame, and each truck frame being movable up and down at either end thereof independently of its other end.

Signed by me at Chicago, Cook County, Illinois, this 29th day of December, 1917.

CHARLES E. STAHL.